(12) United States Patent
Besier et al.

(10) Patent No.: US 11,685,356 B2
(45) Date of Patent: Jun. 27, 2023

(54) VALVE ARRANGEMENT AND BRAKE SYSTEM

(71) Applicant: Continental Teves AG & Co. oHG, Frankfurt am Main (DE)

(72) Inventors: Marco Besier, Frankfurt am Main (DE); Peter Stauder, Frankfurt am Main (DE); Johann Jungbecker, Frankfurt am Main (DE); Michael Jürgens, Frankfurt am Main (DE)

(73) Assignee: CONTINENTAL TEVES AG & CO. OHG, Frankfurt am Main (DE)

( * ) Notice: Subject to any disclaimer, the term of this patent is extended or adjusted under 35 U.S.C. 154(b) by 135 days.

(21) Appl. No.: 16/652,483

(22) PCT Filed: Sep. 25, 2018

(86) PCT No.: PCT/EP2018/075871
§ 371 (c)(1),
(2) Date: Mar. 31, 2020

(87) PCT Pub. No.: WO2019/068501
PCT Pub. Date: Apr. 11, 2019

(65) Prior Publication Data
US 2020/0269826 A1 Aug. 27, 2020

(30) Foreign Application Priority Data
Oct. 6, 2017 (DE) .......................... 102017217791.8

(51) Int. Cl.
B60T 8/36 (2006.01)
B60T 15/02 (2006.01)
(Continued)

(52) U.S. Cl.
CPC .......... B60T 15/028 (2013.01); B60T 8/4081 (2013.01); B60T 13/686 (2013.01);
(Continued)

(58) Field of Classification Search
CPC ...... B60T 8/3645; B60T 8/3675; B60T 8/363; B60T 13/686; B60T 8/368; B60T 15/028;
(Continued)

(56) References Cited

U.S. PATENT DOCUMENTS 3,635,438 A * 1/1972 Peters ................. F16K 31/0655
251/129.1
4,249,780 A 2/1981 Mehren
(Continued)

FOREIGN PATENT DOCUMENTS

CM 1403324 A 3/2003
CN 101428608 A 5/2009
(Continued)

OTHER PUBLICATIONS

International Search Report and Written Opinion for International Application No. PCT/EP2018/075871, dated Nov. 27, 2018, 12 pages.
(Continued)

*Primary Examiner* — Nicholas J Lane
*Assistant Examiner* — Stephen M Bowes
(74) *Attorney, Agent, or Firm* — RatnerPrestia

(57) ABSTRACT

The invention relates to a valve arrangement (10) comprising valves and coil arrangements (20), each coil arrangement (20) having two coils (110, 210) which are electrically connected to separate control units (100, 200). Each valve can be independently actuated by either the first coil (110) or the second coil (210) of the coil arrangement (20) associated therewith. The invention further relates to a brake system (400, 500) having such a valve arrangement (10).

14 Claims, 8 Drawing Sheets

(51) Int. Cl.
  *B60T 8/40* (2006.01)
  *B60T 13/68* (2006.01)
  *F16K 31/06* (2006.01)

(52) U.S. Cl.
  CPC ..... *F16K 31/0679* (2013.01); *B60T 2270/402* (2013.01); *B60T 2270/404* (2013.01); *B60T 2270/82* (2013.01)

(58) Field of Classification Search
  CPC ............. B60T 8/4081; B60T 2270/402; B60T 2270/404; B60T 2270/82; F16K 31/0679
  See application file for complete search history.

(56) References Cited

U.S. PATENT DOCUMENTS

| | | | |
|---|---|---|---|
| 4,337,794 A * | 7/1982 | Yamanaka | F16K 31/0679 137/596.17 |
| 4,590,406 A * | 5/1986 | Ha | B60T 8/3645 315/80 |
| 4,621,660 A * | 11/1986 | Klocke | F16K 31/082 251/129.09 |
| 4,668,023 A * | 5/1987 | Every | B60T 11/34 303/119.2 |
| 4,679,589 A * | 7/1987 | Inden | B60T 8/5043 251/117 |
| 4,821,770 A * | 4/1989 | Parrott | B60T 8/34 303/119.2 |
| 4,859,005 A * | 8/1989 | Rey | B60T 8/34 303/119.3 |
| 4,860,794 A * | 8/1989 | Parrott | B60T 8/3645 303/119.2 |
| 5,445,189 A * | 8/1995 | Yamamuro | B60T 8/36 137/625.65 |
| 6,209,966 B1 | 4/2001 | Mies | |
| 6,616,249 B2 | 9/2003 | Han | |
| 8,246,121 B2 | 8/2012 | Homann et al. | |
| 8,434,520 B2 | 5/2013 | Frank et al. | |
| 9,022,350 B2 | 5/2015 | Jung | |
| 10,131,333 B2 | 11/2018 | Feigel et al. | |
| 2004/0070302 A1* | 4/2004 | Parker | B60T 8/3675 310/194 |
| 2008/0017174 A1 | 1/2008 | Kafer et al. | |
| 2016/0009263 A1 | 1/2016 | Feigel et al. | |
| 2018/0334146 A1* | 11/2018 | Feigel | B60T 13/745 |
| 2019/0031165 A1 | 1/2019 | Besier et al. | |

FOREIGN PATENT DOCUMENTS

| | | | |
|---|---|---|---|
| CN | 101506560 A | 8/2009 | |
| CN | 103786711 A | 5/2014 | |
| CN | 105026232 A | 11/2015 | |
| DE | 2611355 A1 | 9/1977 | |
| DE | 3437487 A1 | 4/1986 | |
| DE | 10051433 A1 | 5/2002 | |
| DE | 102010035954 A1 | 3/2012 | |
| DE | 102013202350 A1 | 8/2014 | |
| DE | 102013224870 A1 | 9/2014 | |
| DE | 102014200071 A1 | 9/2014 | |
| DE | 102014115205 A1 | 4/2016 | |
| DE | 102016212585 A1 | 1/2017 | |
| EP | 1332938 A2 | 8/2003 | |
| EP | 1486681 A1 | 12/2004 | |
| GB | 2225168 A * | 5/1990 | ............ B60T 8/3675 |
| WO | 9839189 A1 | 9/1998 | |
| WO | 2005058664 A2 | 6/2005 | |
| WO | 2016096532 A1 | 6/2016 | |
| WO | 2017148968 A1 | 9/2017 | |

OTHER PUBLICATIONS

German Search Report for German Application No. 10 2017 217 791.8, dated Apr. 24, 2020, with partial translation, 11 pages.
Chinese Office Action for Chinese Application No. 201880063939.9, dated Oct. 8, 2021, with partial English translation, 10 pages.

* cited by examiner

VALVE ARRANGEMENT AND BRAKE SYSTEM

CROSS REFERENCE TO RELATED APPLICATIONS

This application is the U.S. National Phase Application of PCT International Application No. PCT/EP2018/075871, filed Sep. 25, 2018, which claims priority to German Patent Application No. 10 2017 217 791.8, filed Oct. 6, 2017, the contents of such applications being incorporated by reference herein.

FIELD OF THE INVENTION

The invention concerns a valve arrangement with a number of valves, and a brake system with such a valve arrangement.

BACKGROUND OF THE INVENTION

Known valve arrangements are used for example to control brake systems of motor vehicles. Typically, it is necessary to ensure a high availability level. For example, this can be achieved if the brake system is supplied from at least two mutually independent electrical energy sources, and also if components which could be subject to possible failure are designed with redundancy. These components are for example electronic control units (ECUs) or actuators.

SUMMARY OF THE INVENTION

An aspect of the invention is a valve arrangement which is designed as an alternative to known valve arrangements, for example having a higher reliability. A further aspect of the invention is a brake system which uses such a valve arrangement.

This is achieved according to an aspect of the invention by a valve arrangement and a brake system according to the respective main claims. Advantageous refinements can be gathered, for example, from the respective dependent claims. The content of the claims is incorporated in the content of the description by express reference.

An aspect of the invention relates to a valve arrangement. The valve arrangement has a number of valves. Such valves may for example be used to control a fluid flow, for example to block or release this.

The valve arrangement has a plurality of coil arrangements, wherein a respective coil arrangement is assigned to each valve for actuating the valve. By means of the coil arrangement, the valve may for example be opened or closed or also set in intermediate positions. Each coil arrangement has a first coil and a second coil.

The valve arrangement has a first control unit and a second control unit. The first control unit is connected to all first coils in order to actuate these. The second control unit is connected to all second coils in order to actuate these.

Each valve can be operated both by the first coil and by the second coil of the coil arrangement assigned thereto, independently of each other.

By means of the valve arrangement according to an aspect of the invention, a security of operation of the valves can be increased in that the respective valves can each be operated by two coils which are actuated by different control units. Thus on failure of a control unit or a coil, the respective valve can still be operated by the other coil.

It is understood that the phrase "able to be operated independently of each other" does not mean that the first coil and the second coil have predefined valve switch positions which differ from each other. Rather, it means that both the first coil and the second coil can each operate the valve alone, wherein the respective other coil then typically acts similarly or does not act.

The first control unit and the second control unit may be configured redundantly with respect to each other and/or independently of each other. In this way, the security can be increased. A redundant design may mean for example that on failure of any component of the first control unit, the second control unit can take over all tasks, and vice versa. Being configured independently of each other may for example mean that the components of the first control unit are arranged separately from those the second control unit, and hence for example faults which occur in one of the control units are kept away from the respective other control unit.

In particular, the first coils may be electrically isolated from the second coils. This allows mutually independent control. The first control unit may in particular be electrically isolated from the second control unit. In this way, problems due to electrical crosstalk or other phenomena may be avoided.

The first coils may for example be connected to a first circuit board of the first control unit by means of contact pins. The second coils may for example be connected to a second circuit board of the second control unit by means of contact pins. The respective coils may for example each have a dual-pole connection to the respective control unit. Alternatively, they may however for example have a common ground to which the first coils and the second coils are each connected. In this case, for example each coil may be connected to the respective control unit only by one contact pin or one terminal.

According to a preferred embodiment, each coil arrangement has a seal between the respective first coil and the respective second coil. In this way, a passage of moisture between the coils may be avoided. If for example a coil has problems with moisture, the seal can keep the moisture away from the other coil and hence ensure its faultless continued operation.

According to a preferred embodiment, each coil arrangement has a seal between the respective second coil and the second control unit and/or the first control unit. In this way, in a typical arrangement, the penetration of moisture into the respective coil arrangement can be prevented.

According to a preferred embodiment, each coil arrangement has a seal between the respective second coil and the valve to which the coil arrangement is assigned, or a valve dome of this valve. In this way too, propagation of moisture may be prevented and hence a failure risk reduced.

Preferably, each first coil has a respective surrounding first coil housing. Further preferably, each second coil has a respective surrounding second coil housing. In this way, the respective coils can be encapsulated.

Each second coil housing may preferably have a cone for receiving the respective first coil housing of the coil arrangement. The reverse case may also apply. In this way, the coil housings can advantageously be pressed into each other so as to ensure a tight and reliable connection of the coil housings.

The first coil housing and second coil housing of each coil arrangement may preferably overlap. This creates an advantageous magnetic short-circuit. This facilitates the magnetic actuation.

Preferably, the first coils are not connected to the second control unit. Further preferably, the second coils are not connected to the first control unit. This may in particular refer to respective electrical connections. In this way, an advantageous electrical decoupling can be achieved so that the first coils and the first control unit may work independently of the second coils and the second control unit.

Preferably, the valve arrangement has a plurality of valves. In this way, several valves may be controlled simultaneously. However, the operating arrangement may alternatively have only one valve.

An aspect of the invention further relates to a brake system, in particular a brake system for motor vehicles. The brake system has a valve arrangement according to an aspect of the invention. In this context, it is possible to revert to all the embodiments and variants described herein. The brake system furthermore has a number of brake cylinders, wherein the valves of the valve arrangement are connected from and/or to the brake cylinders for controlling a hydraulic flow. Such a brake system allows the advantages described in relation to the valve arrangement according to an aspect of the invention to be achieved for a brake system.

The brake system may in particular be a brake-by-wire system. Such brake systems may be used for example if a braking process is initiated solely by the vehicle electronics. A direct mechanical connection between a brake pedal and the brake is typically no longer provided in this case.

According to one embodiment, the brake system may have a pedal simulator, wherein the valves of the valve arrangement are connected from and/or to the brake cylinders for controlling a hydraulic flow. In this way, a driver of the vehicle may have a feeling which corresponds to that which occurs on operation of a conventional brake pedal. Despite this, the driver only presses against a pedal simulator which transfers the driver's brake force request to a control electronics, wherein the control electronics then generates the braking force.

BRIEF DESCRIPTION OF THE DRAWINGS

Further features and advantages will be taken by a person skilled in the art from the exemplary embodiment described below with reference to the appended drawing. This shows.

DETAILED DESCRIPTION OF THE PREFERRED EMBODIMENTS

Figure 1:
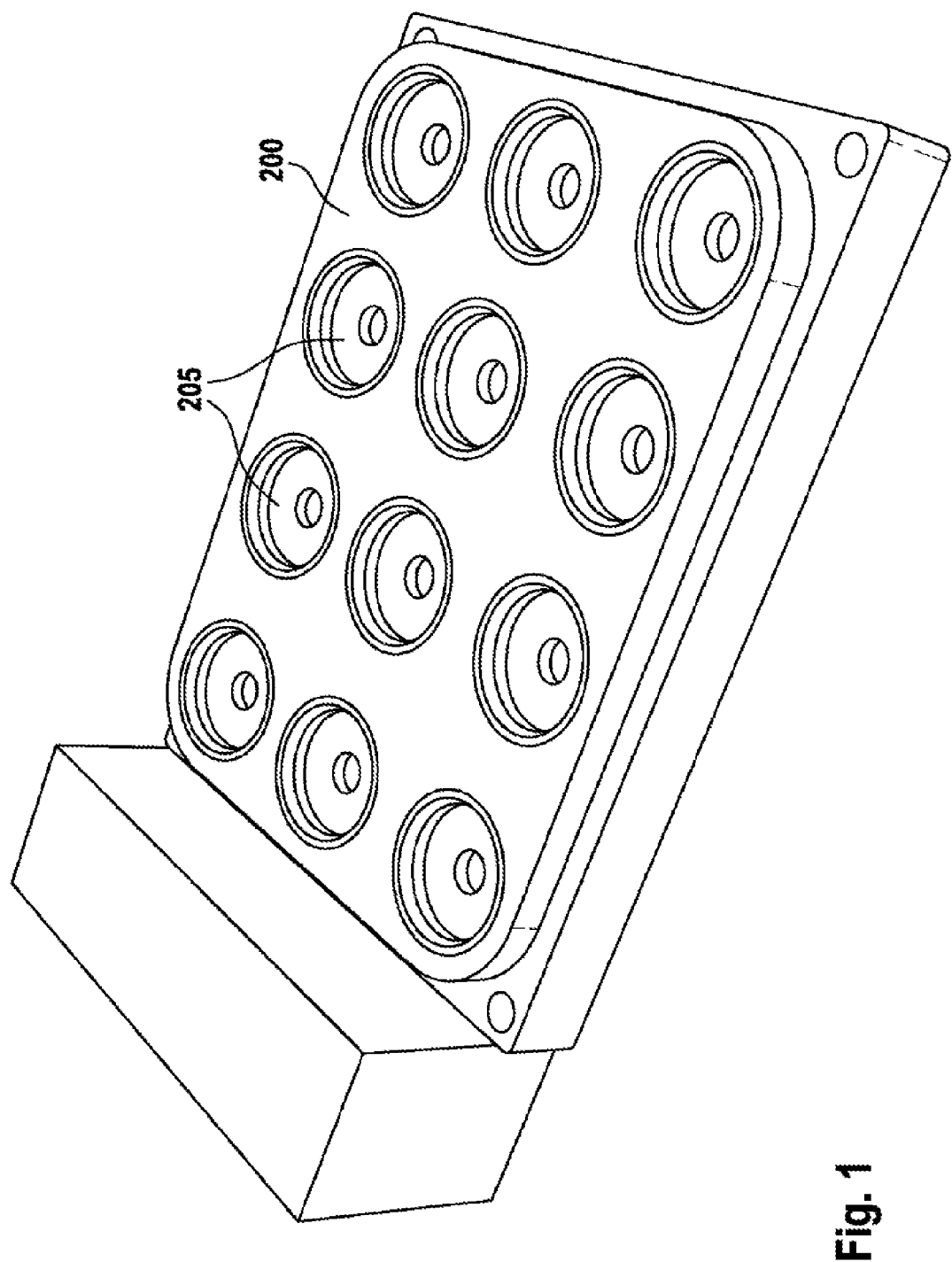
FIG. 1 a part of a valve arrangement,
FIG. 2 another part of the valve arrangement,
FIG. 3 another part of the valve arrangement,
FIG. 4 a part of the valve arrangement in a sectional view,
FIG. 5 a perspective view of the valve arrangement.

FIG. 1 shows a part of a valve arrangement according to an exemplary embodiment of the invention. A second control unit 200 is shown, with depressions 205 formed therein to receive coil arrangements. As shown, a total of twelve such depressions 205 are present, so that twelve coil arrangements can be received and hence twelve valves operated.

Figure 2:
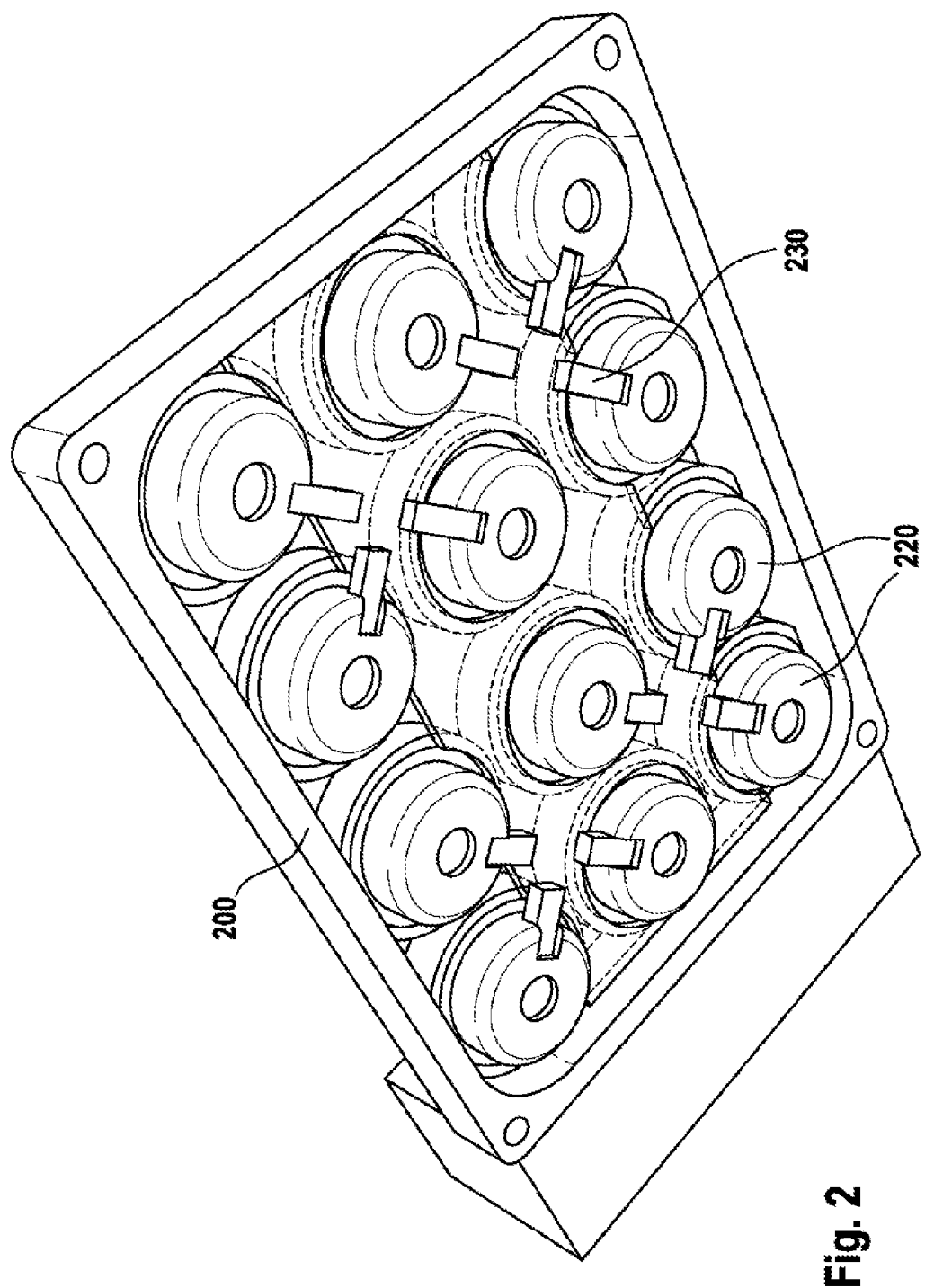

FIG. 2 shows the second control unit 200 in a different view from below. It is clear that second coil housings 220 are inserted in the respective depressions 205, and receive respective coils as will be explained further below. Outside the second coil housings 220, respective contact pins 230 are arranged which create a contact between the control unit 200 and the coils in the second coil housing 220. This will be discussed in more detail later on.

Figure 3:
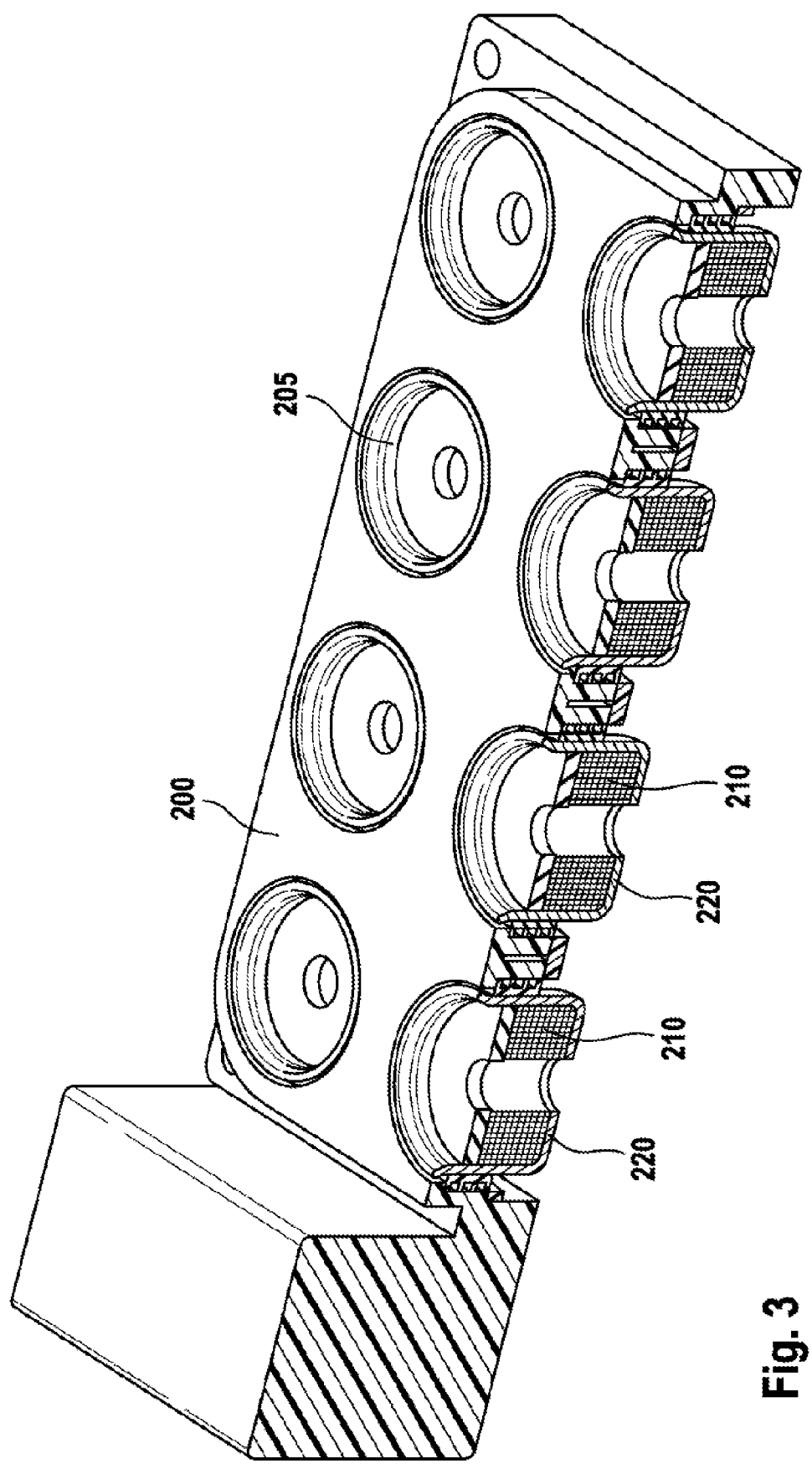

FIG. 3 shows a sectional view of the second control unit 200 together with second coils 210 and second coil housings 220. It is evident that the second coil housings 220 partially surround the second coils 210. A second coil 210 is arranged in each of the depressions 205.

Figure 4:
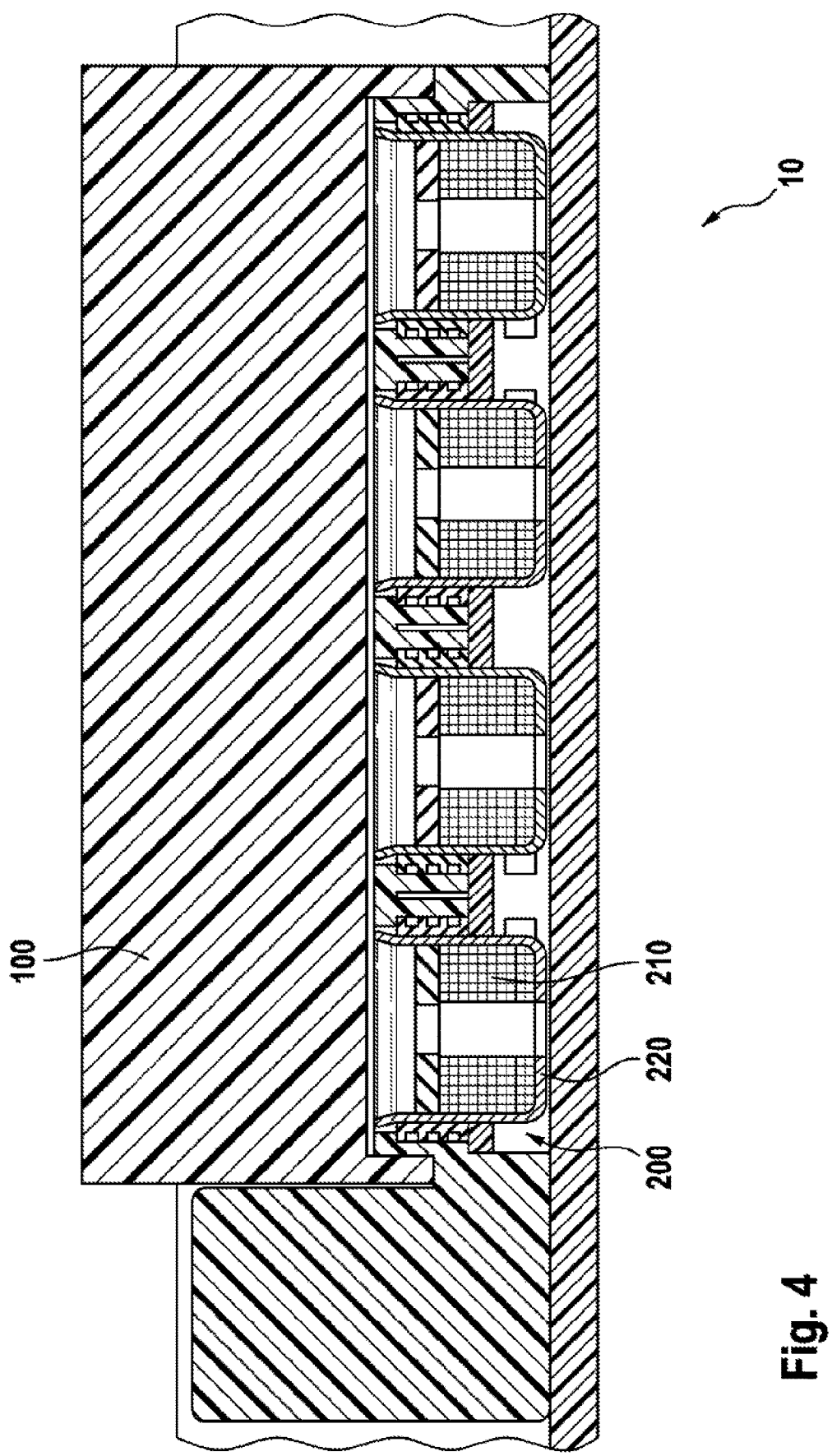

FIG. 4 shows a diagrammatic view of a valve arrangement 10. The above-mentioned second control unit 200 is here arranged on the underside, wherein also the second coils 210 and the second housings 220 can be seen. A first control unit 100, which is configured separately from and redundantly to the first control unit 200, is arranged above the second control unit 200. The function of said control units will be discussed in greater detail below.

Figure 5:
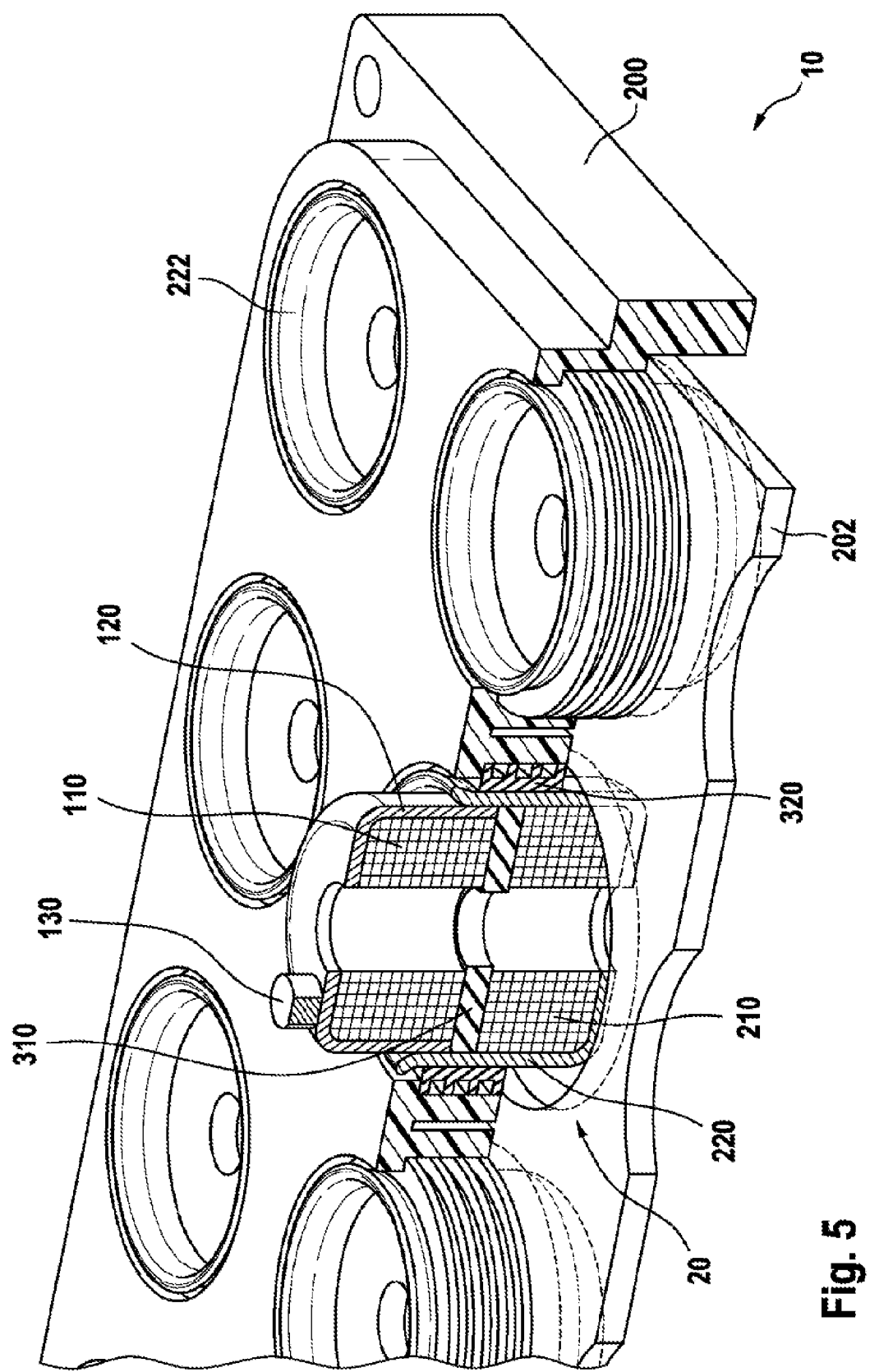

FIG. 5 shows the valve arrangement 10 in a perspective view partially in cross-section.

Firstly, the above-mentioned second control unit 200 and the second coils 210 connected thereto and the second coil housings 220 are evident. The second control unit 200 has a second circuit board 202 on which the electrical components of the second control unit 200 are mounted. This second circuit board 202 is also connected to the second coils 210.

Furthermore, FIG. 5 shows a first coil 110 which is formed directly above the second coil 210. The first coil 110 is formed separately from the second coil 210. It is connected to a circuit board (not shown) of the first control unit 100 (not shown in FIG. 5) by means of a contact pin 130.

The first coil 110 and the second coil 210, shown in FIG. 5, together form a coil arrangement 20. Each coil arrangement 20 serves to operate a valve (not shown).

The first coil 110 may be actuated by the first control unit 100. At the same time, the second coil 210 may be actuated by the second control unit 200 completely independently and separately. This allows a redundant design so that, on failure of the first control unit 100 or the first coil 110, actuation is still possible by means of the second control unit 200 and the second coil 210. The reverse case also applies.

The control units 100, 200 may for example be connected to different power supplies and in particular may be electrically completely isolated and separated from each other.

The first coil 110 is surrounded by a first coil housing 120. The first coil housing 120 protects the first coil 110 externally against mechanical and other damage.

A first seal 310 is arranged inside the coil arrangement 20. It is situated between the first coil 110 and the second coil 210. This prevents the transport of moisture between the two coils 110, 210, so that in the case that one of the two coils 110, 210 comes into contact with moisture because of a defect, the other coil 110, 210 is not also affected.

Furthermore, a second seal 320 is provided which is arranged between the second coil 210 and the second control unit 200, i.e. the control unit on the underside. In particularly advantageous fashion, this seals the control arrangement 20 at points which otherwise would be particularly susceptible to the penetration of moisture.

As can be seen, the second coil housings 220 each have a cone 222 in which the respective first coil housing 120 is inserted. This allows a particularly good seat and tight connection of the two coil housings 120, 220.

Figure 6:
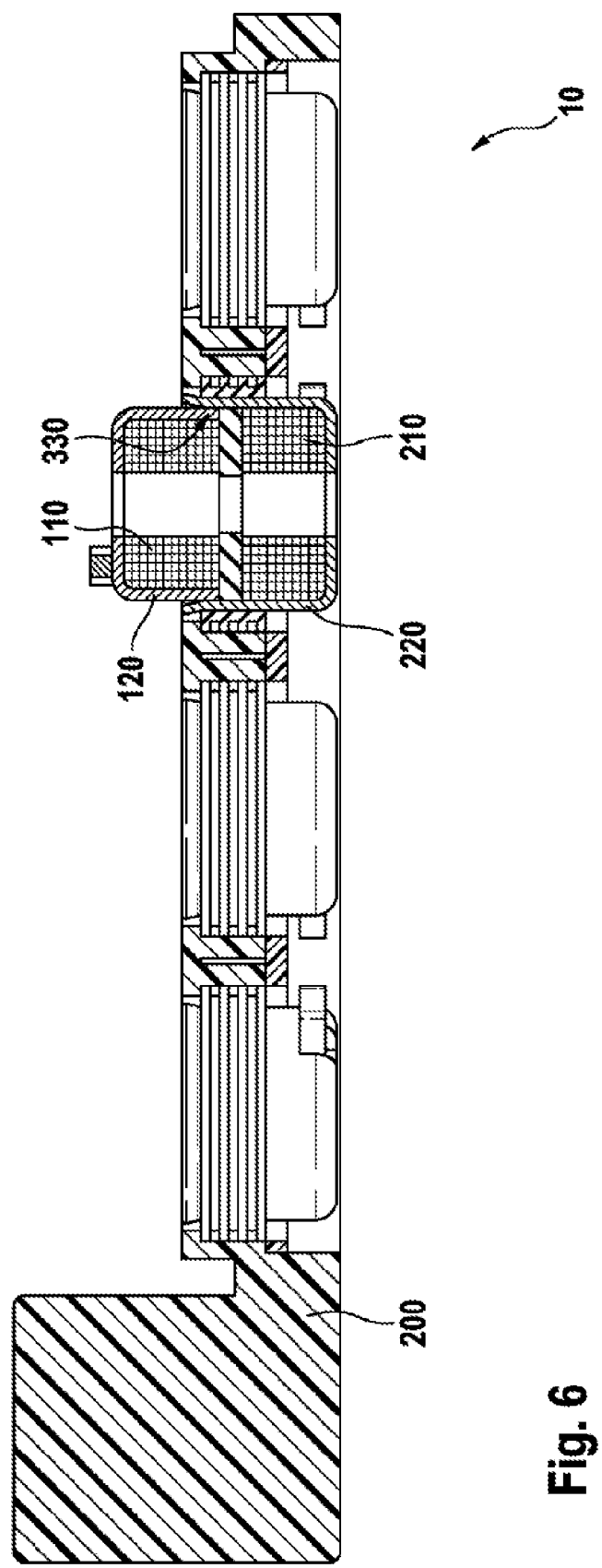
FIG. 6: a further sectional view of the valve arrangement.

FIG. 6 shows a sectional view of the valve arrangement 10. The above-mentioned components are at least partially evident. Furthermore, it can be seen that the first coil housing 120 and second coil housing 220 overlap at an overlap region 330, so as to achieve an advantageous design of a magnetic short-circuit.

In addition to the components described above, the valve arrangement 10 in particular has valves (not shown) which can be actuated by means of the coil arrangements 20.

Figure 7:
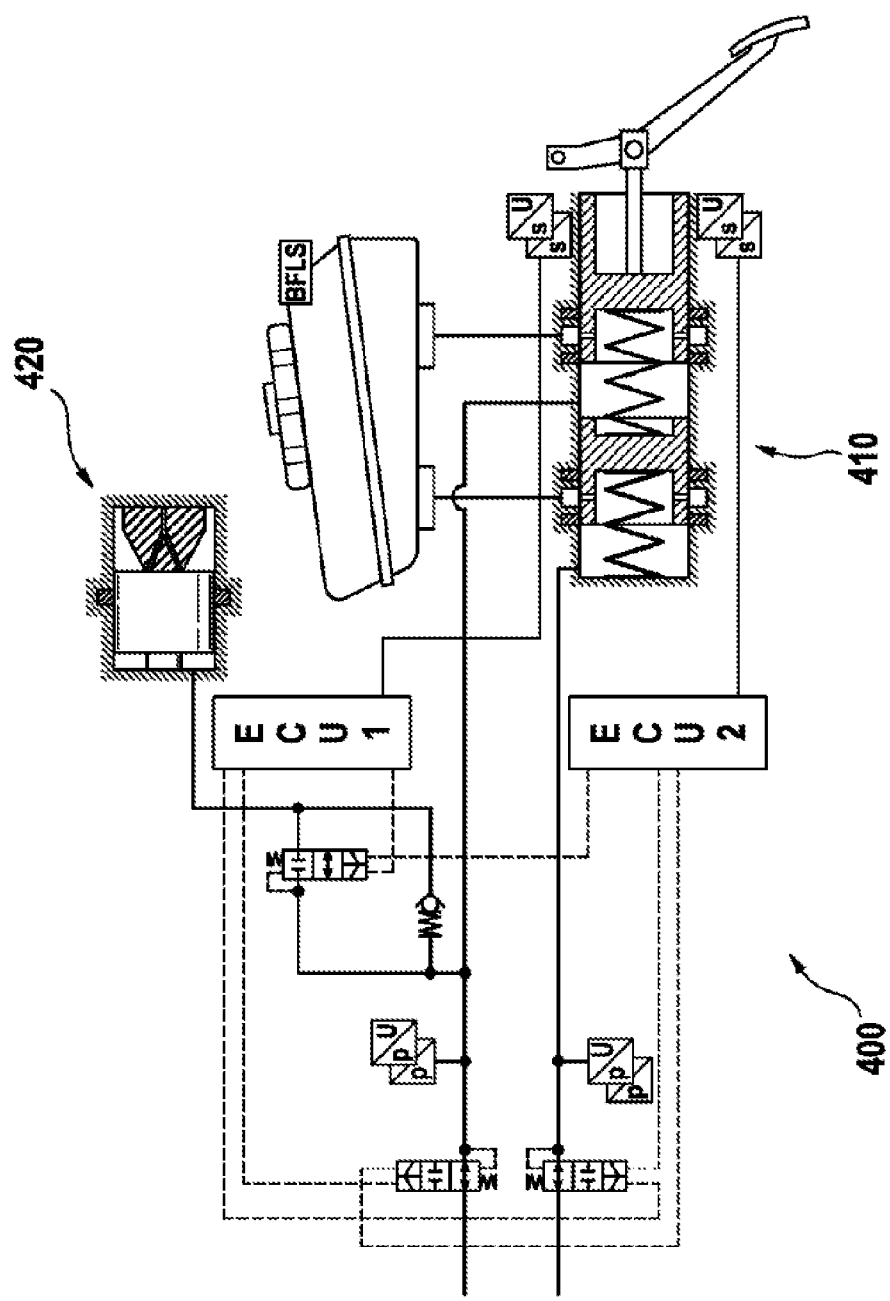
FIG. 7: a brake system.

FIG. 7 shows a brake arrangement 400 according to a first exemplary embodiment. A pedal simulator 410 is shown which gives a user of a brake pedal the feeling that he is operating a conventional hydraulic brake. In reality however, the movement of the brake pedal is recorded and a corresponding braking process is triggered by electronic switching of valves. The valves shown may in particular be valves which are part of the valve arrangement 10 as described above.

Furthermore, an operating unit 420 can be seen which is actuated by means of the valves and triggers a braking effect. The precise functionality of the brake arrangement 400 shown in FIG. 7 is not described in more detail here. In this respect, reference is made to the circuit diagram.

Figure 8:
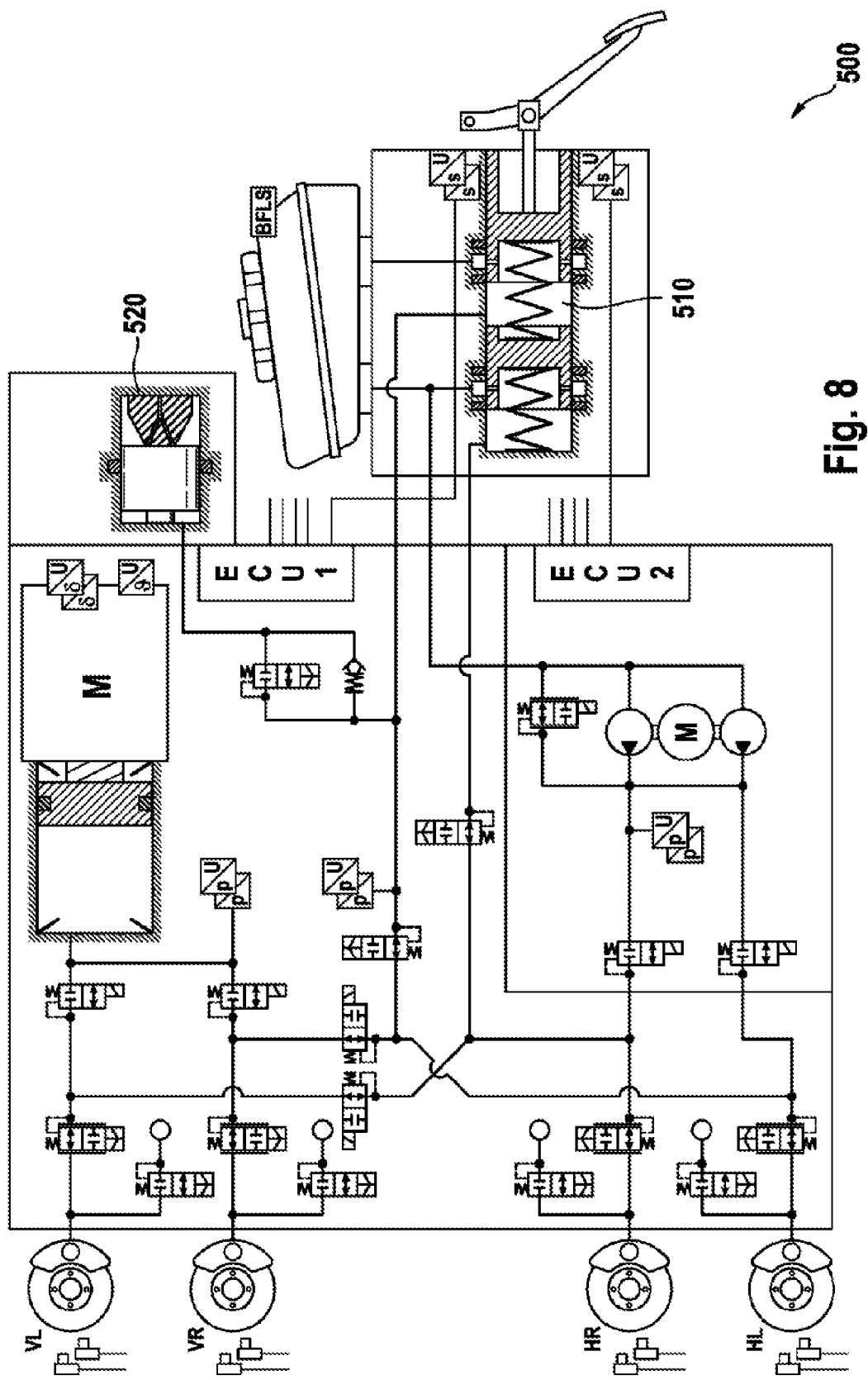
FIG. 8: a further brake system.

FIG. 8 shows a brake arrangement 500 according to a second exemplary embodiment. Here again, a pedal simulator 510 can be seen. Also, an operating unit 520 is visible. Valves are also evident which may be designed in particular as described above with respect to the valve arrangement 10. Otherwise, the brake unit 500 shown in FIG. 8 is not described in more detail.

With regard to the functionality of the brake systems 400, 500 shown in FIGS. 7 and 8, reference is made to figures.

In general, a concept for implementing a redundant solenoid valve coil actuation for brake control systems may be described.

For this, it may for example be proposed to construct a coil actuation system for generating a magnetic field for solenoid valves such that they can be actuated independently by two different control units, normally known as electronic control units (ECUs), or control units, and with a secure electrical isolation. A split valve coil pack may thus be electrically connected to both ECUs and hence be able to be actuated electrically by both ECUs independently. This may in particular mean that each ECU alone can switch the corresponding valve, or also both together.

This is achieved by a split valve coil pack for solenoid valves as depicted for example in FIG. 5. Here, the upper coil may be connected to a first ECU and the lower coil to a second ECU. The contacting of the lower coil is illustrated diagrammatically in FIG. 2. Contact pins of the coil may here be connected to a circuit board or to another contact carrier. The upper coil may be connected to the upper circuit board (not shown) of the first ECU via the contacting depicted diagrammatically in FIG. 5. To guarantee independent function of the two coils, a seal may be provided which ensures that no fluid or moisture can cause an electrical short-circuit between the two coils or ECUs. For this, a seal may be provided on the outside between the lower coil housing and the ECU housing or coil box, and a further seal may be provided on the inside between the housing of the lower coil and the valve or valve dome. To mount the upper ECU or coil box or upper coil, a cone may be provided on the housing of the lower coil. In this way, component or mounting tolerances may be compensated, and also mounting or insertion of the upper coil in the housing of the lower coil can be guaranteed. As shown in FIG. 6, the housings of the two coils may overlap in mounted state, whereby a desired magnetic flux can be ensured or produced.

A split valve coil pack may in particular be push-fitted onto a solenoid valve or valve dome. Thus the component mounting and replacement concept usual today may be used. Here, for example as shown in FIG. 4, the upper and the lower ECU or coil boxes may be mounted on a hydraulic block as a preassembled unit, or firstly the lower ECU or lower coil box and then the upper one may be mounted or replaced individually.

With this design, on failure of one ECU, it is still possible for another intact ECU to electrically actuate the solenoid valve or correspondingly equipped solenoid valves, and switch them as desired.

The duplicated or redundant actuation of solenoid valves is advantageous in particular in the design and operation of brake control systems. For example, in the case of an electrohydraulic brake-by-wire system, it is thus possible to perform a dynamic reconfiguration of the brake system during operation. This means that for example, on failure of one ECU during operation, the other, still intact ECU can maintain the normal by-wire operation with normal by-wire switching of the solenoid valves.

Thus for example, in an electrohydraulic brake-by-wire system with pedal simulator, there is also no irritation for the driver owing to influencing of the pedal characteristic, because the actuation unit is hydraulically connected to the pedal simulator in the fault-free, normal brake-by-wire operating mode.

As an example, FIG. 7 depicts an extract of a possible brake-by-wire system which substantially comprises the operating system, solenoid valves and pedal simulator. The unpowered switch position of the solenoid valves is shown.

The implementation described herein is in particular also advantageous for redundant actuation of further solenoid valves in the brake system. Thus also, for example, the wheel pressure modulation may be designed for redundant actuation. For this, according to the concept described, the wheel pressure modulation valves may also be actuated redundantly. This can be used for example in a brake system as depicted in FIG. 8.

The concept proposed herein for implementation of a redundant solenoid valve coil actuation for brake control systems in particular allows improved and redundant functionalities of brake control systems or brake systems. This can be used amongst others, as depicted as an example, for a redundant modulation of wheel pressure or a redundant switching of a driver isolation valve for an electrohydraulic brake-by-wire function.

The modular design concept of the ECUs proposed herein is particularly advantageous since it ensures complete galvanic decoupling of the two partial ECUs, and thus allows duplicated or redundant actuation of the solenoid valves in brake control systems. Also, the design concept offers an isolating seal against moisture between the two partial ECUs. This achieves a high operating reliability and a high level of redundancy in brake control systems.

The concept is also compatible with production and assembly technologies normally used today in brake control systems.

It is understood that the components described herein as duplicated, i.e. in particular the control unit and coils, may in principle also be produced in threes, fours or multiples. For example, three control units may be provided and accordingly also three coils may be provided per coil arrangement. The statements made herein apply accordingly and correspondingly.

The claims that are part of the application do not represent any renouncement of the attainment of further protection.

If it turns out in the course of proceedings that a feature or a group of features is not absolutely necessary, then the applicant aspires right now to a wording for at least one independent claim that no longer has the feature or the group of features. This may be, by way of example, a subcombination of a claim available on the filing date or may be a subcombination of a claim available on the filing date that is limited by further features. Claims or combinations of features of this kind requiring rewording are intended to be understood to be covered by the disclosure of this application as well.

It should further be pointed out that configurations, features and variants of aspects of the invention that are described in the various embodiments or exemplary embodiments and/or shown in the figures are combinable with one another in any way. Single or multiple features can be interchanged with one another in any way. Combinations of features arising therefrom are intended to be understood to be covered by the disclosure of this application as well.

Back-references in dependent claims are not intended to be understood as dispensing with the attainment of independent substantive protection for the features of the back-referenced subclaims. These features can also be combined with other features in any way.

Features that are disclosed only in the description or features that are disclosed in the description or in a claim only in conjunction with other features may fundamentally be of independent significance essential to an aspect of the invention. They can therefore also be individually included in claims for the purpose of distinction from the prior art.

The invention claimed is:

1. A valve arrangement comprising:
a number of valves,
a number of coil arrangements, wherein a respective coil arrangement is assigned to each valve for actuating the valve, and wherein each coil arrangement has a first coil and a second coil,
a first control unit, and
a second control unit,
wherein the first control unit is connected to all first coils in order to actuate these,
wherein the second control unit is connected to all second coils in order to actuate these, and
wherein each valve can be operated both by the first coil and by the second coil of the coil arrangement assigned thereto, independently of each other,
wherein each first coil has a respective first coil housing comprising a first sidewall surrounding the first coil at a first radial distance and each second coil has a respective second coil housing comprising a second sidewall surrounding the second coil at a second radial distance greater than the first radial distance, and
wherein the first sidewall of the first coil housing and the second sidewall of the second coil housing of each coil arrangement overlap in a radial direction of the coil arrangement, the overlap extending less than an entire axial length of the first and second coil housings.

2. The valve arrangement as claimed in claim 1,
wherein the first control unit and the second control unit are configured redundantly with respect to each other and/or independently of each other.

3. The valve arrangement as claimed in claim 2, wherein the first coils are electrically isolated from the second coils, and/or wherein the first control unit is electrically isolated from the second control unit.

4. The valve arrangement as claimed in claim 1,
wherein the first coils are electrically isolated from the second coils,
and/or
wherein the first control unit is electrically isolated from the second control unit.

5. The valve arrangement as claimed in claim 1,
wherein the first coils are connected to a first circuit board of the first control unit by contact pins,
and/or
wherein the second coils are connected to a second circuit board (202) of the first control unit by contact pins.

6. The valve arrangement as claimed in claim 1,
wherein each coil arrangement has a seal between the respective first coil and the respective second coil, the second sidewall surrounding the seal at the second radial distance.

7. The valve arrangement as claimed claim 1,
wherein each coil arrangement has (i) a seal between the respective second coil and the second control unit or (ii) a seal between the respective second coil and the first control unit.

8. The valve arrangement as claimed in claim 1,
wherein each second coil housing has a cone for receiving the respective first coil housing of the coil arrangement.

9. The valve arrangement as claimed in claim 1,
wherein the first coils are not connected to the second control unit,
and/or
wherein the second coils are not connected to the first control unit.

10. The valve arrangement as claimed in claim 1,
wherein the valve arrangement has a plurality of valves.

11. A brake system comprising:
a valve arrangement as claimed in claim 1, and
a number of brake cylinders,
wherein the valves of the valve arrangement are connected from and/or to the brake cylinders for controlling a hydraulic flow.

12. The brake system as claimed in claim 11, which furthermore comprises a pedal simulator, and wherein the valves of the valve arrangement are connected from and/or to the pedal simulator for controlling a hydraulic flow.

13. The brake system as claimed in claim 11,
wherein the brake system is a brake-by-wire system.

14. The brake system as claimed in claim 13,
which furthermore comprises a pedal simulator, and
wherein the valves of the valve arrangement are connected from and/or to the pedal simulator for controlling a hydraulic flow.

* * * * *